(12) United States Patent
Christensen

(10) Patent No.: US 6,520,723 B2
(45) Date of Patent: Feb. 18, 2003

(54) RACK WITH BUILT-IN WINCH COMPONENT

(76) Inventor: David Christensen, 11 Moores Mill Rd., Hopewell Mercer County, NJ (US) 08534

(*) Notice: Subject to any disclaimer, the term of this patent is extended or adjusted under 35 U.S.C. 154(b) by 0 days.

(21) Appl. No.: 09/912,929

(22) Filed: Jul. 25, 2001

(65) Prior Publication Data

US 2001/0043845 A1 Nov. 22, 2001

Related U.S. Application Data

(63) Continuation-in-part of application No. 09/757,356, filed on Jan. 9, 2001, which is a continuation-in-part of application No. 09/399,828, filed on Sep. 21, 1999, now Pat. No. 6,203,259.

(51) Int. Cl.[7] .......................... B61D 45/00; B65D 63/00
(52) U.S. Cl. ......................... 410/100; 410/34; 410/97; 410/103
(58) Field of Search .............................. 296/3; 254/214, 254/223, 243; 410/12, 32, 34, 97, 100, 101, 103

(56) References Cited

U.S. PATENT DOCUMENTS

| | | |
|---|---|---|
| 2,048,374 A | 7/1936 | Childress |
| 2,146,104 A | 2/1939 | Adamson |
| 2,738,204 A | 3/1956 | Ibey |
| 3,428,331 A | 2/1969 | Morgan et al. |
| 3,697,045 A | 10/1972 | Farley |
| 4,045,002 A | 8/1977 | Miller |
| 4,174,119 A | 11/1979 | Biles |
| 4,382,736 A | 5/1983 | Thomas |
| 4,900,203 A | 2/1990 | Pope |
| 5,137,320 A | 8/1992 | Christensen |
| 5,238,280 A | 8/1993 | Christensen |
| 5,494,327 A | 2/1996 | Derecktor |
| 5,755,549 A | 5/1998 | Ogrodnick |
| 5,791,844 A | 8/1998 | Anderson |
| 5,848,743 A | 12/1998 | Derecktor |
| 5,882,058 A | 3/1999 | Karrer |

FOREIGN PATENT DOCUMENTS

GB          2 038 268 A      7/1980

Primary Examiner—D. Glenn Dayoan
Assistant Examiner—Scott Carpenter
(74) Attorney, Agent, or Firm—Kenneth P. Glynn

(57) ABSTRACT

The present invention is a support rack with a built-in winch component. The rack unit includes at least two upright members and at least one horizontal support member connected at opposite ends to each of the upright members, and at least one shaft-receiving orifice located on and passing through either an upright member and/or horizontal support member. In some preferred embodiments, a plurality of the orifices may be included, e.g. at lower and higher levels of the uprights, as well as on the horizontal supports. Also, in some preferred embodiments, gussets are included to connect the uprights to the horizontal supports. These gussets may include shaft-receiving orifices. The upright members provide attachment to a motor vehicle, e.g. as part of the uprights, or as separate components. The winch component has a shaft, a strap take-up reel, a one-way ratchet mechanism, a wind-up mechanism, and a lock-release mechanism, with the shaft being rotatably positioned within a shaft-receiving orifice on the uprights, horizontal supports or gussets.

10 Claims, 5 Drawing Sheets

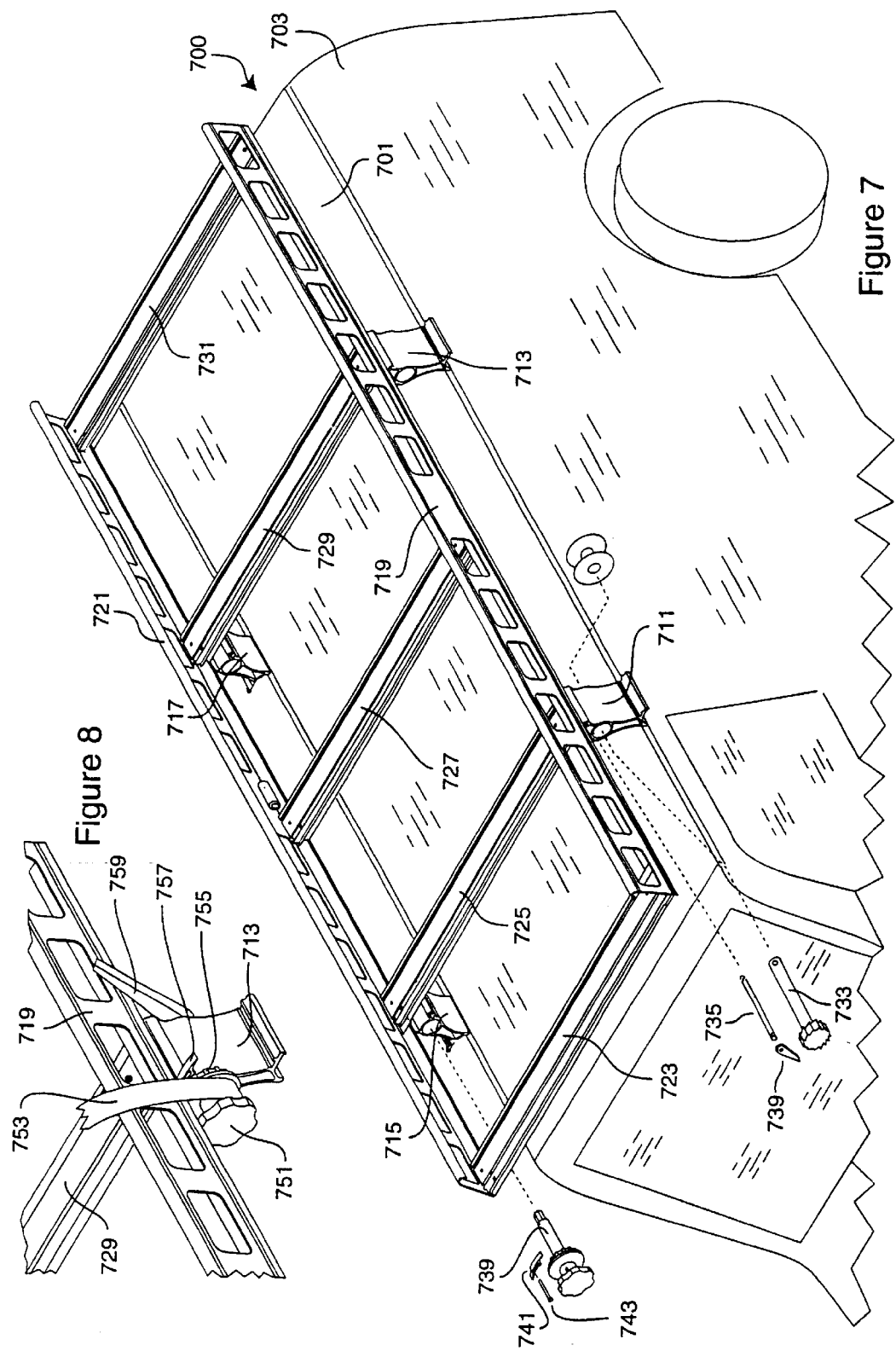

RACK WITH BUILT-IN WINCH COMPONENT

REFERENCES TO RELATED APPLICATIONS

This application is a continuation-in-part of U.S. patent application Ser. No. 09/757,356 filed on Jan. 9, 2001 entitled "Reversible, Portable Winch With Bidirectional Ratchet Teeth For Attachment To A Load-Bearing Structure," by the inventor herein, which itself was a continuation-in-part of copending U.S. patent application Ser. No. 09/399,828 filed on Sep. 21, 1999, entitled "Reversible, Portable Winch With Bidirectional Ratchet Teeth" by the inventor herein, now issued U.S. Pat. No. 6,203,259.

BACKGROUND OF THE INVENTION

1. Field of the Invention

The present invention involves unique winches for attachment to load-bearing structures, such as buildings, vehicles, etc., and especially to ladder utility racks attached to truck beds of pick up trucks, vans, the like. The winches involve the use of rack support structures to which they may be installed and from which they may be removed for portability. The present invention also includes the winch components without their conventional frames.

2. Information Disclosure Statement

The following represents patents which illustrate pick-up truck cargo bed utility racks and others which illustrate winches:

UK Patent No. 2,038,268 A to Ivor William James Small describes a winch device, in or for use in a load-carrying vehicle or other similar mobile apparatus, comprising a support member having two brackets, a bar rotatably mounted at each end portion thereof in one of the two brackets, a ratchet wheel fixedly mounted at one end region of said bar adjacent a first one of said brackets, a pawl pivotally mounted on said first bracket successively to engage teeth of the ratchet wheel, load-encircling means in the form of webbing or strapping, one of said load-encircling means being secured to an intermediate region of the bar so as to facilitate winding of the of the means about the bar as the pawl successively engages said teeth, a fixed stop member to limit pivotal movement of the pawl in one direction and a removable stop member to limit pivotal movement of the pawl in a second, opposite direction.

U.S. Pat. No. 2,048,374 to William C. Childress describes the combination in a strap stretching device, of a frame, a drum rotatably mounted in said frame and having means for receiving a strap to be wound thereon, an operating lever pivotally mounted on said drum, a pawl pivotally mounted on said operating lever and actuated normally to engage said ratchet wheel, a detent pivotally mounted in said frame and actuated normally to engage said ratchet wheel, and cams mounted on said pawl and said detent and adapted to engage each other upon a predetermined movement of said operating lever for disengaging both said pawl and said detent from said ratchet wheel.

U.S. Pat. No. 2,146,104 to Andrew E. Adamson describes a tensioning device with the combination of a generally inverted U-shaped frame, a strap gripping device comprising a flat member fixed in relation to said frame and a movable gripper having a flat lug overlaying said flat member, a strap tensioning member on the other leg of said frame, a handle rigidly attached to said frame, a movable handle pivotally mounted on said frame operable to actuate said tensioning member, said handles being positioned entirely above the lower ends of said legs.

U.S. Pat. No. 2,738,204 to Robert R. Ibey, describes, in combination, a truck floor adapted for holding a load thereon, a stake mounted at one side thereof and having a pivot disposed horizontally and immediately above the level of the floor, a plate having one end hinged to the pivot and being free to swing from a horizontal position above and adjacent to the floor level to a desired angular position, a pair of flanges rising from the plate at right angles to said pivot and adjacent thereto, a winch drum revolvable between the flanges above the plate on an axis running parallel to the axis of the pivot, a cable, means for securing one end of the cable to the side of the floor opposite the stake with the body portion of the cable lying over the load and means for securing the other end of the cable upon the winch drum for winding operations to tighten the cable upon the load, the cable having unobstructed access to the winch drum and the pivot allowing the traction face of the winch drum to automatically orient itself within the line of draft.

U.S. Pat. No. 3,428,331 to Melvin C. Morgan describes a loaded mobile bed, as a truck bed, and a load maintaining binder structure in the nature of a wide flexible band detachably hooked to one side rail of the bed, extending over the load, and detachably connected to the opposite side rail of the bed, through a winch. The winch is characterized by a drum thereof comprising a plurality of spaced and longitudinally extending rods, a stub shaft and a circular plate welded to each of the end portions of the rods, and pawl and ratchet means permitting rotation of the drum in one direction and preventing rotation in the other direction.

U.S. Pat. No. 3,697,045 to Holt A. Farley, describes an invention in which a U-shaped winch frame has a winding drum for a flexible tie-down element journaled in its arms which have notches in their opposite edges into which is fixedly secured to the body of a vehicle so that the winch can be freely slid along said truck into different positions relative to the truck body and the cargo load thereon.

U.S. Pat. No. 4,045,002 to Errol S. Miller describes an invention in which an improved vehicle-mounted winch is disclosed characterized by a sliding bar allowing use of a web or strand to be secured thereto and tightened thereby, e.g., to secure a load.

U.S. Pat. No. 4,174,119 to James A. Biles describes a device for attachment to an upright post on a bed of a pick-up truck or other vehicle for gripping one end of a tie-down rope to apply tension to the rope to hold pipe or other load on the vehicle when the rope passes over the load and as the opposite end of the rope is secured to the vehicle. The device includes a shiftable, generally upright bar coupled with a jacking until secured by a bracket to the post. A cam member on the upper end of the bar is used to wedge the rope against the bar after the rope has been passed over the load. Then, by operating the jacking unit, the bar is caused to be lowered, thereby placing tension on the rope and holding the load in a rigid, secure position on the vehicle. The movement of the bar can be reversed to remove the tension by operating the jacking unit in reverse.

U.S. Pat. No. 4,382,736 to Allan R. Thomas describes a belt winch apparatus for holding a belt at the side of a load carrying trailer vehicle the apparatus having interlocking means so that the apparatus can be supported by interlocking between the tie rail and the outer side of the vehicle tray and hold the belt under tension holding the load while in the same position.

U.S. Pat. No. 4,900,203 to Ronald W. Pope, describes a load-tie-down system which includes a load-supporting structure having a side support and a second support. A winch assembly is operably mounted on the load-supporting structure and includes a winch frame having a crosspiece and two struts projecting downward from the crosspiece. A winch drum is rotatably mounted between the two struts of the winch frame and a belt is attached at one end to and wound around the winch drum. A hook is attached to the free end of the belt. The belt is anchored by the hook attaching to an anchor located on the winch frame. The anchor includes a bar on the winch frame around which the hook may fasten. A lock to restrain the rotation of the winch drum is also included having a ratchet wheel attached to the winch drum and a pawl pivotally attached to the winch frame. The winch drum and anchor are located so that the belt may extend around the crosspiece and a load and then anchor on the winch frame.

U.S. Pat. No. 5,137,320 to David Christensen describes a ladder utility rack for pick-up truck cargo beds. It has two parallel horizontal base rails and at least two vertical stanchion units. Each base rail has horizontal and vertical running surfaces and each is adapted to nest atop and against sidewalls of a cargo bed. These base rails are not connected to one another except via the stanchion units. These units have vertical legs running from each of the base rails upwardly and inwardly and terminate at a commonly connected horizontal cross member. A second embodiment includes an additional set of rails, i.e. mounting rails, which run parallel to the base rails and, together with the base rails, form a horizontal platform for mounting items thereon to be transportable.

U.S. Pat. No. 5,238,280 to David Christensen, describes a ladder utility rack for pick-up cargo beds. It has two parallel horizontal base rails and at least two vertical stanchion units. Each base rail has at least three contiguous walls, including at least one horizontal and one vertical running wall and each is adapted to nest atop and against sidewalls of a cargo bed. These base rails are not connected to one another except via the stanchion units. These units have vertical legs running from each of the base rails upwardly and inwardly and terminate at a commonly connected horizontal cross member. A preferred embodiment includes rails which are unistructurally formed, e.g. extruded, including portions in the form of an upright or inverted "U".

U.S. Pat. No. 5,494,327 to Thomas E. Derecktor describes a sliding connection especially suited for releasably and adjustably attaching an overhead rack or the like to side walls of a pickup truck includes a track mountable on the side wall of the pickup truck, and a sliding lock assembly releasably attachable to the rail member. The track includes an elongate tubular body having a bottom surface engagable with the side wall of the pickup truck and a top surface opposite the bottom surface, and a plurality of rail members integrally formed with the tubular body and extendable along the length of the body. The sliding lock assembly includes, in one embodiment, a sliding lock member of the track and movable along the length of the rail member, and a thumb turn for locking the sliding lock member at a desired position along the length of the rail member.

U.S. Pat. No. 5,755,549 to Clarence Ogrodnick, describes a support frame which is secured within the cargo box of a pick-up truck. The frame supports a drive train comprising a differential driven by a motor. One differential shaft drives a first cable winch while the other shaft incorporates a clutch to drive a second and third winch either independently from each other or in unison. A system of pulleys ensures that cable wind on the first and second winches is toward the front of the cargo box while on the third winch it is toward the rear. The cable ends are secured to a cargo platform. When the electric motor is engaged the first and second winches are rotated, in a counterclockwise direction which winds the cable into the winch body. The retracting cable first raises and then draws the platform onto the frame. During this process the third winch freewheels and releases cable as necessary. Unloading the platform requires that the clutch mechanism is engaged to couple the second and third winches together. The motor is reversed and the first, second, and third winches rotate in a clockwise direction. The third winch retracts cable while the first and second winches release cable. The retracting cable, draws the platform off the support frame and toward the rear of the cargo box. As the platform draws far enough rearward to tilt off the support frame, the clutch is disengaged and the third winch freewheels, leaving the platform to continue to lower under its own weight.

U.S. Pat. No. 5,791,844 to Robert D. Anderson describes an improved winch crank assembly for use on typical flatbed trailers whereon cargo is secured using flexible straps. It permits the rapid winding of the straps onto the winch and reduces the time required for winding the straps by tenfold or more. The winch crank assembly comprises a portable crank assembly wherein a single crank can be used to wind the straps onto a plurality of winches on a single trailer. In addition, the portability allows the user to conveniently carry the crank for use on other truck trailers.

U.S. Pat. No. 5,848,743 to Thomas E. Derecktor describes an invention in which a vehicle roof rack includes a track having an elongate tubular body with a thin wall which defines substantially the entire outer perimeter of the tubular body. The thin wall has a top wall section with an upwardly opening channel formed therein and a top wall section opposite the bottom wall section. The roof rack further includes a pair of support brackets for supporting the track in an elevated position above the roof of the vehicle. Each support bracket has a pair of fasteners for releasably attaching the support brackets to a gutter of the vehicle. At least one sliding fastening assembly is releasably attachable to the upwardly opening channel of the top wall section of the track. The sliding fastening assembly includes a member slidably mounted on the top wall section of the track and movable along the length of the channel, and a pair of fasteners for securing the member at a desired position along the length of the channel.

U.S. Pat. No. 5,882,058 to Robert B. Karrer describes a cargo anchoring and protection system that particularly is provided for pickup trucks. The system includes six basic contributing components that operate individually or together to multiply their usefulness. These include: a pair of extruded anchor rails are provided to be removably attached to the top surface of the truck bed side walls; a bed liner with an optional separate floor section; a universal anchor beam; a cab guard with optional cargo access doors; a cargo bed enclosure; and a rear bumper.

Notwithstanding the prior art, the present invention is neither taught nor rendered obvious thereby.

SUMMARY OF THE INVENTION

The present invention is a support rack for attachment to a motor vehicle with a built-in winch component, and has been developed to enable truckers (pick-ups, vans and other vehicles) with ladder type racks of any sort, to utilize the inherent strength of a rack to support a winch component. Heretofore, winches required a base which served multiple purposes. The base provided a support for a shaft, a stationary location for a winch lock and a bracket for attachment. However, these prior art bases required materials and machining and could not be used for mounting on vehicles without drilling and bolting. It would also prevent mobility or relocation of a winch without substantial effort. Additionally, exterior mounted winches create outside obstacles. The present invention invention eliminates these problems, providing increased strength, ease of assembly and strategic locations while permitting mobility.

The present invention includes a rack unit for attachment to a motor vehicle, which includes at least two upright members and at least one horizontal support member connected at opposite ends to each of the upright members, and at least one shaft-receiving orifice located on and passing through either one of the upright members and or horizontal support member. In some preferred embodiments, a plurality of said orifices may be included, e.g. at lower and higher levels of the uprights, as well as on the horizontal supports. Also, in some preferred embodiments, gussets are included to connect the uprights to the horizontal supports, and these gussets may include shaft-receiving orifices.

The upright members include some form of attachment means for attachment to a motor vehicle, and these may be part of the uprights, flanges attached to the uprights or any known attachment means.

The winch component of the present invention has a shaft, a strap take-up reel, a one-way ratchet mechanism, wind-up means, and a lock-release mechanism, with the shaft being rotatably positioned within a shaft-receiving orifice on the uprights, horizontal supports or gussets.

The present invention's support rack with built-in winch component may have at least four upright members and at least two horizontal support members in some embodiments, and may include lengthwise and crosswise horizontal support members or only one or the other of these.

In some of the present invention embodiments, the upright members are elongated and the connecting means are adapted for connection to a bed of a pick-up truck, flat truck or other high ladder rack. On other embodiments, the support rack with built-in winch component of the present invention has connecting means which are adapted for connection to at least one of a roof and walls of a motor vehicle van, and are typically relatively short.

In some preferred embodiments, the winch component also includes:

(a) a shaft securing mechanism for securing the shaft in the shaft-receiving orifice while allowing its rotation;

(b) the take-up reel for winding and unwinding a flexible securing strap, connected to the shaft and affixed thereto for rotation therewith;

(c) a flexible securing strap connected to the strap take-up reel at a first end thereof;

(d) a plurality of unidirectional pawl-engaging teeth located about the shaft and affixed thereto so as to prevent and permit rotation of the take-up reel and the shaft by being engaged and disengaged with the pawl so as to act as a one-way ratchet;

(e) a pawl operationally connected to the teeth for engaging and disengaging thereof; and, (f) the winding means being connected to one of said shaft and said take-up reel for winding the shaft and the take-up reel.

For example, the plurality of unidirectional pawl-engaging teeth are located on a disk which is affixed to the shaft.

The pawl may be a stand alone element having a pivoting shaft for engaging and disengaging, which pivoting shaft is removably connected to one of the upright members, gussets and the horizontal support member and located adjacent to the unidirectional pawl-engaging teeth, for engaging and disengaging said teeth. In some preferred embodiments, the uprights, horizontal supports and the gussets may have small holes located near all of the shaft-receiving orifices to receive removable pawls so that a pawl and winch component could be relocated together.

The winding means may be a gripping wheel located on the shaft or may be any known winch winding means. If it is a gripping wheel, it may be formed from a side of the take-up reel. Alternately, it could be a handle connected to the shaft.

BRIEF DESCRIPTION OF THE DRAWINGS

The present invention should be more fully understood when the specification herein is taken in conjunction with the drawings appended hereto wherein:

FIG. 8 illustrates a partial side view thereof with an additional wind component.

DETAILED DESCRIPTION OF THE PRESENT INVENTION

The present invention is a rack and a portable winch component, as described above. Due to the portability and reversibility of the winch, a user is able to remove and install the winch component to any location on the rack, which is adapted to receive and hold the shaft of the winch component for use in tying down loads on the rack, such as ladders, lumber, pipes, etc.

Figure 1:
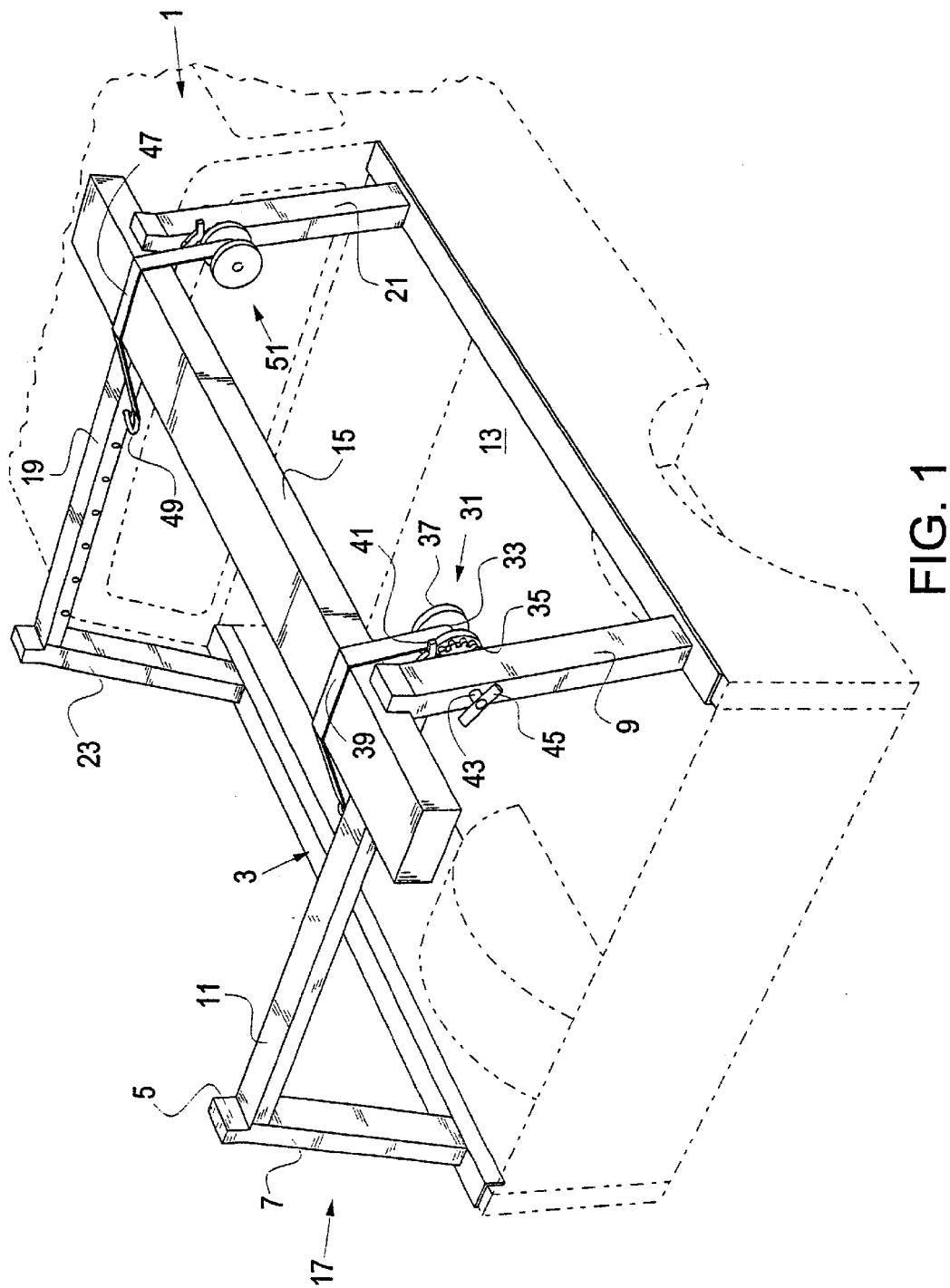
FIG. 1 shows an oblique view of a present invention rack and portable winch component.

FIG. 1 shows an oblique view of a truck rack with a unidirectional, portable winch. Thus, truck 1 has attached to its bed 13 a utility rack 3 having upright members, such as vertical column 7 and horizontal support members, such as connecting cross member 11. Two stanchions are established in this rack. Rear stanchion 17 includes substantially vertical columns (upright members) 7 and 9 and horizontal, connecting cross member (horizontal support member) 11. Stops, such as stop 5, are also included. Front stanchion includes substantially vertical columns (upright members) 21 and 33 and horizontal connecting cross member (horizontal support member) 19. In this case, beam 15 has been secured to the utility rack by present invention portable, unidirectional winches 31 and 51.

Referring now specifically to winch 31, it includes a spool 33 which has on one side, a wheel handle 37, and on its other side, a set of unidirectional ratchet teeth 35 for engagement and disengagement with pawl 41. Pawl 41 has a pin on which it pivots or rotates for locking and unlocking with teeth 35 to tighten, hold and then loosen strap 39. Strap 39 is connected to the spool 33 and has a securing hook on its opposite end (not shown). Winch 51 is similar and has a security strap 47 with hook 49. Removable handle 45 is attached to shaft 43 and may be used to tighten spool 33 with pawl 41 then locking into an appropriate tooth. Thus, straps 39 and 47 secure beam 15 to the rack by being tightened by the handles and locked into place by the pawls, as described.

Figure 2:
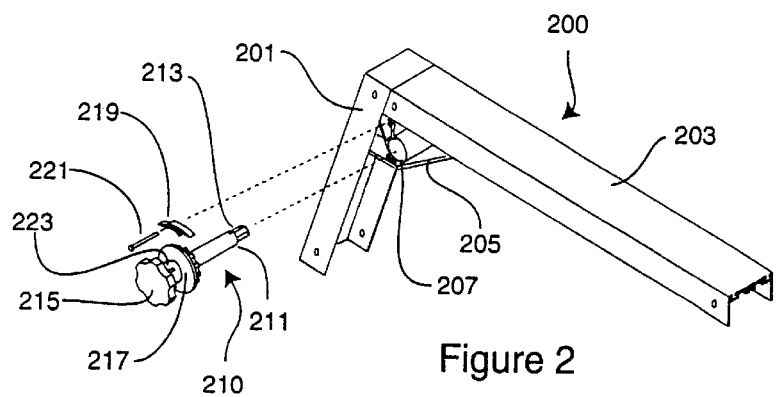
FIGS. 2 and 3 show oblique cut views of different embodiment of a present invention rack and portable winch component.

FIG. 2 shows an oblique cut view of an alternative present invention rack 200 and winch component 210. Rack 200 includes upright member 201, horizontal support member 203, connecting gusset 205 and a second gusset and upright member, not shown. Gusset 205 is formed of extruded aluminum and includes a tubular orifice 207 for receiving a winch shaft. It also includes a flat member with a small hole for receiving a pin or screw of a pawl. In this case, winch component 210 has a shaft 211 for insertion into orifice 207 for rotation therein. Securing means 213 is included to permit rotation of shaft 211, but to prevent unintentional removal of shaft 211 from orifice 207. Securing means 213 could be an orifice and pin, a cap, a threaded shaft and nut, or otherwise.

Winch component 210 also includes a toothed ratchet member 217 and a rotation handle 215 and is locked into place by pawl 219 which is secured to gusset 205 with screw 219. Between toothed ratchet member 217 and rotation handle 215 is a take-up reel area 223 for a strap attachment for securing a load to rack to member.

Figure 3:
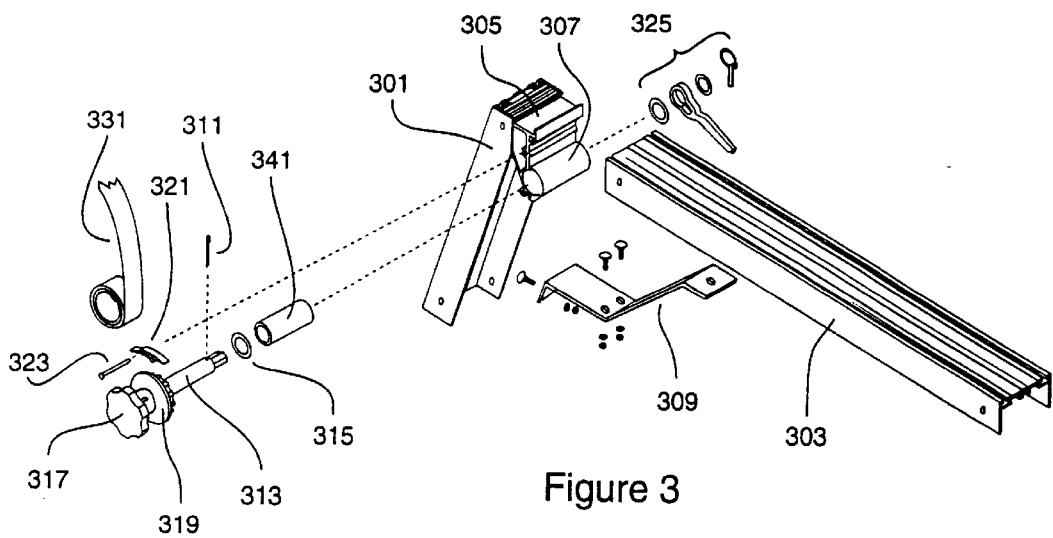

FIG. 3 shows a partial oblique view of another present invention rack and winch component in a dissembled view. Here, upright member 301, horizontal support member 303 and gusset 305 are assembled to form one side of a rack stanchion, with brace 309 included for additional structural support. Gusset 305 is screwed, bolted or riveted to upright member 301 and to horizontal support member 303 and includes a shaft receiving orifice 307. The winch component includes a shaft 313, unidirectional ratchet 319, handle 317 and locking pin 311. Optional washer 315 and lubricous sheath 341 are also included. Take-up strap 331 is attached to the take-up reel located between handle 317 and ratchet 319. Pawl 321 is attached to a small hole strategically located on gusset 305 with securing pin 323 so as to lock and unlock ratchet 319, as a user may desire. Handle assembly 325 may optionally be attached to the far end of shaft 313 to provide extra leverage in winding up the take-up reel.

Figure 4:
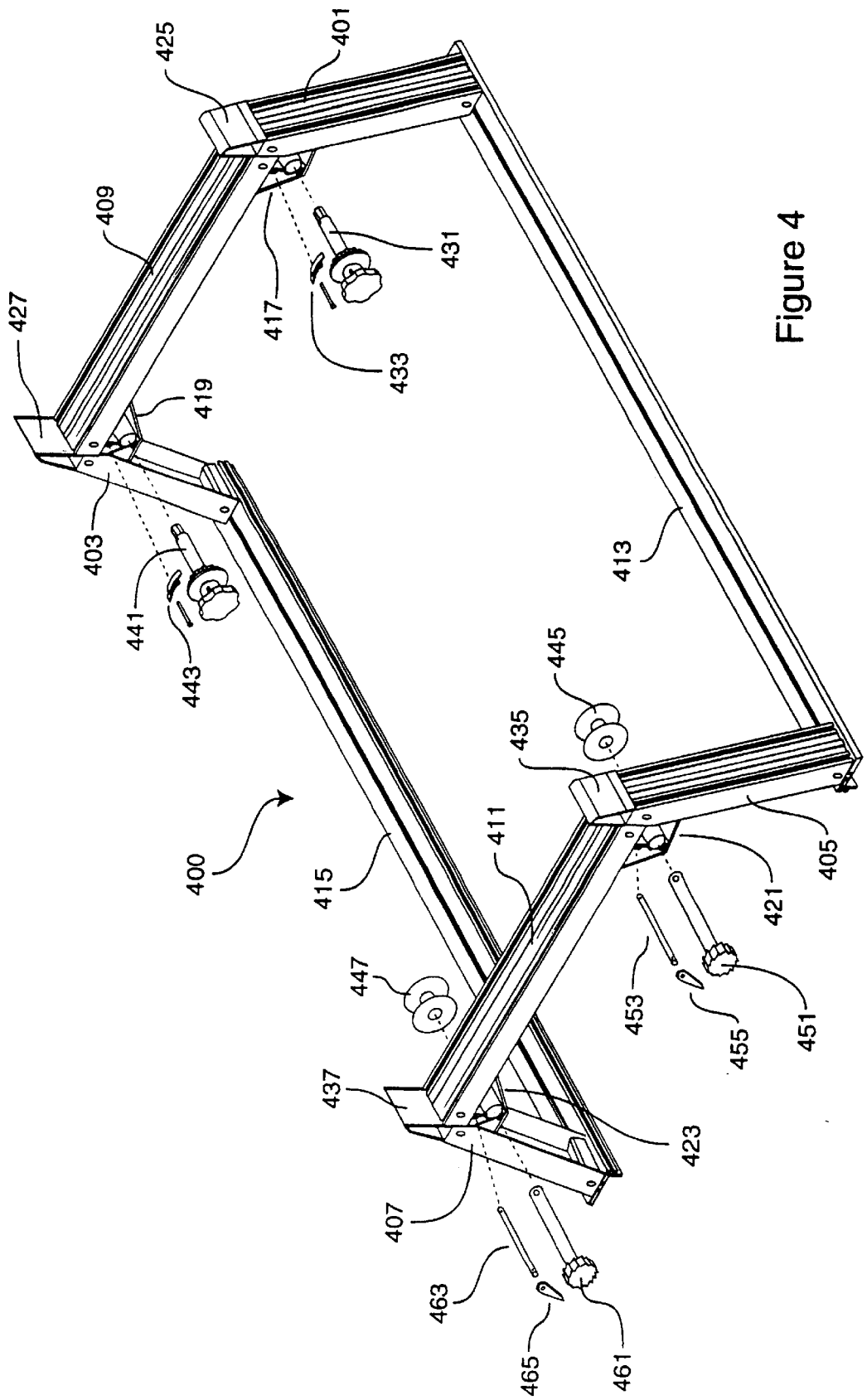
FIG. 4 shows an oblique view of a pick-up truck bed rack and various winch components of the present invention.

FIG. 4 shows a pick-up truck rack for attachment to a bed of the truck with four corner sets of unidirectional winch components. Thus, utility rack 400 has upright members 401, 403, 405 and 407 and horizontal support members 409 and 411, as shown. The upright members are connected to base attachment means 413 and 415, which, in turn, may be attached to the top of a bed of a pick-up truck. The upright members and horizontal support members are connected to one another via gussets 417, 419, 421 and 423. Stops 425, 427, 435 and 437 are also included. Each gusset 417, 419, 421 and 423 includes a shaft-receiving orifice for receiving the winch components shown in this Figure adjacent thereto.

Referring now specifically to winch 431, it includes a spool which has on one side, a wheel handle, and on its other side, a set of unidirectional ratchet teeth for engagement and disengagement with pawl 433, as shown. Pawl 433 has a pin on which it pivots or rotates for locking and unlocking with the teeth so that a user may tighten, hold and then loosen a strap attached to the spool for securing a load. Winch 441 is similar and operates in a similar fashion, but rotates in the opposite direction. Winch components 451 and 461 are different from the previous two mentioned and have separate spools 445 and 447 which fixedly attach to the shafts, respectively, for rotation therewith. These are secured by pins 453 and 563 and pawls 455 and 465, as shown.

Figure 5:
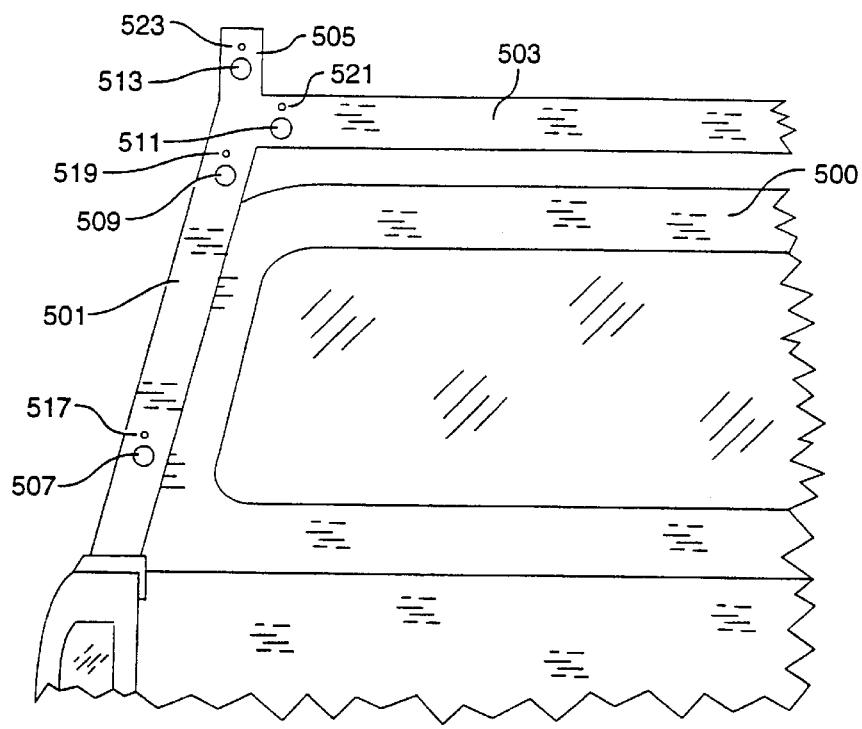
FIGS. 5 and 6 show end views of portions of a utility rack and pick-up truck, and rack and van used with present invention winch components, showing some possible winch shaft-receiving orifices; and, FIG. 7 shows an oblique partial view of alternative van rack with varied winch components
Figure 6:
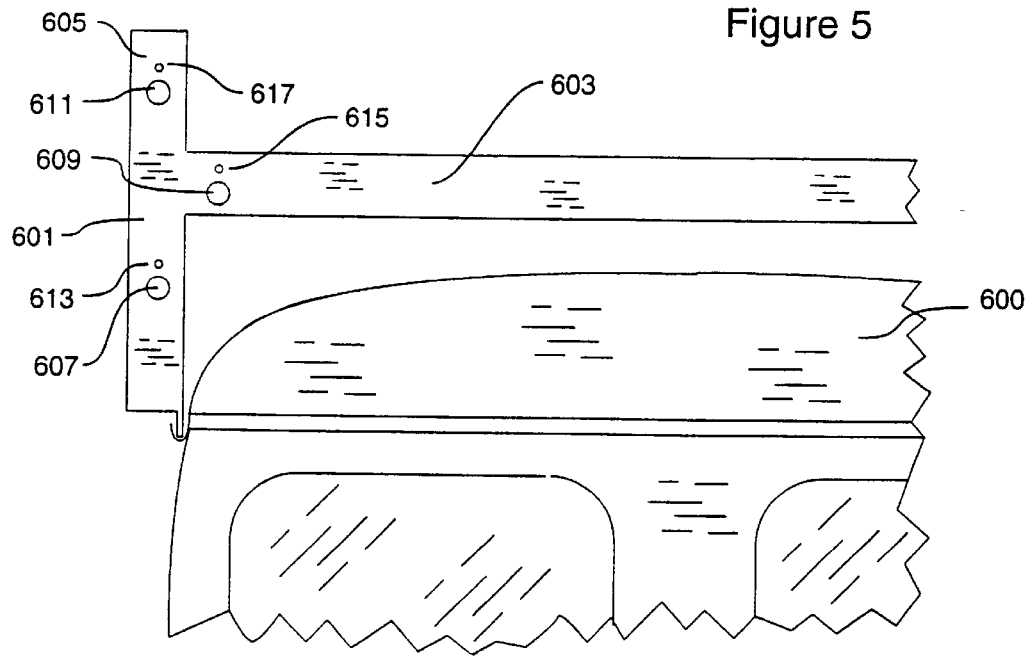

FIG. 5 and FIG. 6 show end views of portions of pick-up truck 500 and van 600, with racks of the present invention shown diagrammatically to illustrate some of the possible locations on the racks of shaft-receiving orifices for the present invention winch components. Thus, in FIG. 5, upright member 501 includes shaft-receiving orifice 507 and 509 and pawl pinholes 517 and 519. Upright stop extension 505 has shaft-receiving orifice 513 with pawl pinhole 523. Also, horizontal support member 503 includes shaft-receiving orifice 511 with pawl pinhole 521. Likewise, in FIG. 6, van rack horizontal support member 603 has a shaft-receiving orifice 609 and a pawl pinhole 615. Upright member 601 includes shaft-receiving orifices 607 and 611 with pawl pinholes 613 and 617, respectively. Other locations on the rack may be selected with out excluding the scope of the present invention.

FIG. 7 shows an oblique partial view of a van and van rack with winch components. Thus, van 700 has a rack attached to the roof 701/sidewall 703 drain seem by attachments of fitted attachment means located at the base of upright member 711, 713, 715 and 717. Attached directly thereto is the top element which includes longitudinal rails 719 and 721 and horizontal cross member 723, 725, 727, 729 and 731. Upright member 711 has an orifice into which winch component 733 and its spool are attached, with pawl 739 and pawl pin 735 separately attached to upright member 711. Likewise, upright member 715 has a winch component 739 with pawl 741 and pin 743 adapted for attachment thereto.

FIG. 8 shows another possible winch component arrangement for the rack shown in FIG. 7. In this case, identical parts are identically numbered and winch component 751 and unidirectional ratchet 755 and pawl 757 are attached to upright member 713. Similarly to winch component 739 shown in FIG. 7, winch component 751 includes strap 753 and tightening handle 759.

Obviously, numerous modifications and variations of the present invention are possible in light of the above teachings. It is therefore understood that within the scope of the appended claims, the invention may be practiced otherwise than as specifically described herein.

What is claimed is:

1. A support rack for attachment to a motor vehicle with a built-in winch component, which comprises:
   a) a rack unit for attachment to a motor vehicle, which includes at least two upright members, at least two support gussets and at least one horizontal support member connected at opposite ends with said at least two gussets to each of said upright members, and at least one shaft-receiving orifice located on and passing through one of said upright members, said gussets and said horizontal support member;
   b) attachment means on said upright members for attachment to a motor vehicle; and,
   c) a winch component having a shaft, a strap take-up reel, a one-way ratchet mechanism, windup means, and a lock-release mechanism, said shaft being rotatably positioned within said at least one shaft-receiving orifice.

2. The support rack with built-in winch component of claim 1 wherein there are at least four upright members and at least two horizontal support members.

3. The support rack with built-in winch component of claim 2 wherein said upright members are elongated and said connecting means are adapted for connection to a bed of a pick-up truck.

4. The support rack with built-in winch component of claim 2 wherein said connecting means are adapted for connection to at least one of a roof and walls of a motor vehicle van.

5. The support rack with built-in winch component of claim 1 wherein said winch component also includes:

(a) a shaft securing mechanism for securing said shaft in said shaft-receiving orifice while allowing its rotation;

(b) said take-up reel for winding and unwinding a flexible securing strap, being connected to said shaft and affixed thereto for rotation therewith;

(c) a flexible securing strap connected to said strap take-up reel at a first end thereof;

(d) a plurality of unidirectional pawl-engaging teeth located about said shaft and affixed thereto so as to prevent and permit rotation of said take-up reel and said shaft by being engaged and disengaged with said pawl so as to be a one-way ratchet;

(e) a pawl operationally connected to said teeth for engaging and disengaging thereof; and, (f) said winding means being connected to one of said shaft and said take-up reel for winding said shaft and said take-up reel.

6. The support rack with built-in winch component of claim 5 wherein said plurality of unidirectional pawl-engaging teeth are located on a disk which is affixed to said shaft.

7. The support rack with built-in winch component of claim 5 wherein said pawl is a stand alone element having a pivoting shaft for engaging and disengaging, which pivoting shaft is removably connected to one of said upright members and said horizontal support member and located adjacent to said unidirectional pawl-engaging teeth, for engaging and disengaging said teeth.

8. The support rack with a built-in winch component of claim 5 wherein said winding means is a gripping wheel located on said shaft.

9. The support rack with built-in winch component of claim 8 wherein said gripping wheel is a side of said take-up reel and includes gripping means located thereon.

10. The support rack with built-in winch component of claim 5 wherein said winding means is a handle connected to said shaft.

* * * * *